US012220908B2

(12) United States Patent

Sahara et al.

(10) Patent No.: US 12,220,908 B2
(45) Date of Patent: Feb. 11, 2025

(54) PRINTING APPARATUS, AND CONTROL METHOD

(71) Applicant: CANON KABUSHIKI KAISHA, Tokyo (JP)

(72) Inventors: Akiyoshi Sahara, Chiba (JP); Kaede Ono, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 17/976,699

(22) Filed: Oct. 28, 2022

(65) Prior Publication Data

US 2023/0150280 A1 May 18, 2023

(30) Foreign Application Priority Data

Nov. 16, 2021 (JP) ................................. 2021-186522

(51) Int. Cl.
*B41J 11/66* (2006.01)
*B41J 2/165* (2006.01)
*B41J 11/00* (2006.01)

(52) U.S. Cl.
CPC ............ *B41J 11/663* (2013.01); *B41J 11/007* (2013.01)

(58) Field of Classification Search
CPC .. B41J 2/16505; B41J 2/16511; B41J 11/663; B41J 11/007
See application file for complete search history.

(56) References Cited

U.S. PATENT DOCUMENTS

2012/0236061 A1* 9/2012 Yudasaka ............. B41J 2/16538 347/16
2016/0052266 A1 2/2016 Takarabe et al. ........ B41J 2/045
2018/0029372 A1 2/2018 Sahara et al. ............ B41J 2/165

FOREIGN PATENT DOCUMENTS

JP 2015-085531 5/2015
JP 2018-020460 2/2018
JP 2018020460 A * 2/2018

* cited by examiner

*Primary Examiner* — Jason S Uhlenhake
(74) *Attorney, Agent, or Firm* — Venable LLP

(57) ABSTRACT

A printing apparatus includes: a cap member configured to be switched between a capped state in which an ink discharge port of a printhead is covered by the cap member and a non-capped state; a conveyance unit configured to convey a print medium to the printhead; and a cutting unit configured to cut the print medium on which an image is formed by the printhead. A cutting setting for operating the cutting unit can be set in advance based on a cutting instruction of a user. In a case in which the cutting setting is set, the cap member waits for the cutting instruction in the non-capped state, and the cap member is switched to the capped state when a wait time for the cutting instruction reaches a predetermined time.

21 Claims, 16 Drawing Sheets

PRINTING APPARATUS, AND CONTROL METHOD

BACKGROUND OF THE INVENTION

Field of the Invention

The present invention relates to a printing technique using a liquid.

Description of the Related Art

A printing apparatus that can use, as a print medium, a long print medium such as a roll sheet is provided with a cutter configured to cut the print medium after a printing operation. Japanese Patent Laid-Open No. 2015-85531 discloses a printing apparatus that allows a user to select not only a setting for automatically performing cutting of the print medium after the printing operation but also a setting for performing cutting at a timing instructed by the user. In the setting for performing cutting at a timing instructed by the user, cutting of the print medium can be performed after the user confirms an image (ink image) on the print medium has dried.

In addition, a printing apparatus that performs printing by discharging a liquid from a printhead to a print medium is provided with a maintenance mechanism that maintains/recovers the liquid discharge performance of the printhead. Japanese Patent Laid-Open No. 2018-20460 discloses a printing apparatus including a maintenance mechanism that shares a motor serving as a driving source with a conveyance roller. If the conveyance roller and the maintenance mechanism share the motor, the apparatus can be made compact.

In a printing apparatus having a setting for performing cutting at a timing instructed by a user, like the printing apparatus disclosed in Japanese Patent Laid-Open No. 2015-85531, when the time to wait for the user instruction is long, drying of the liquid discharge port of the printhead may progress. As a method of suppressing drying of the liquid discharge port, capping the liquid discharge port using a cap member of the maintenance mechanism is known. However, if capping is performed each time during a wait for the user instruction, throughput may lower in a job in which, for example, the printing operation continues. Also, for example, in a printing apparatus that shares a motor with a conveyance roller, like the printing apparatus disclosed in Japanese Patent Laid-Open No. 2018-20460, the conveyance roller may rotate at the time of capping because of the mechanism, and the cut position of the print medium changes.

SUMMARY OF THE INVENTION

The present invention provides a technique for suppressing drying of a liquid discharge port in a printing apparatus having a cut setting for cutting a print medium at a timing instructed by a user.

According to an aspect of the present invention, there is provided a printing apparatus comprising: a cap member configured to be switched between a capped state in which an ink discharge port of a printhead is covered by the cap member and a non-capped state; a conveyance unit configured to convey a print medium to the printhead; and a cutting unit configured to cut the print medium on which an image is formed by the printhead, wherein a cutting setting for operating the cutting unit can be set in advance based on a cutting instruction of a user, and in a case in which the cutting setting is set, the cap member waits for the cutting instruction in the non-capped state, and the cap member is switched to the capped state when a wait time for the cutting instruction reaches a predetermined time.

Further features of the present invention will become apparent from the following description of exemplary embodiments (with reference to the attached drawings).

DESCRIPTION OF THE EMBODIMENTS

Figure 1A:
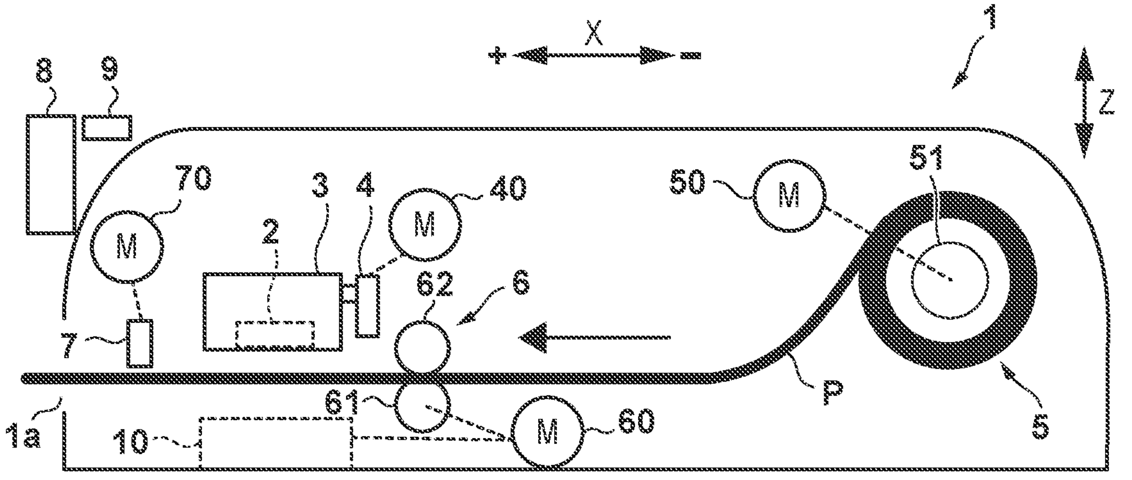
FIGS. 1A and 1B are schematic views of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1B:
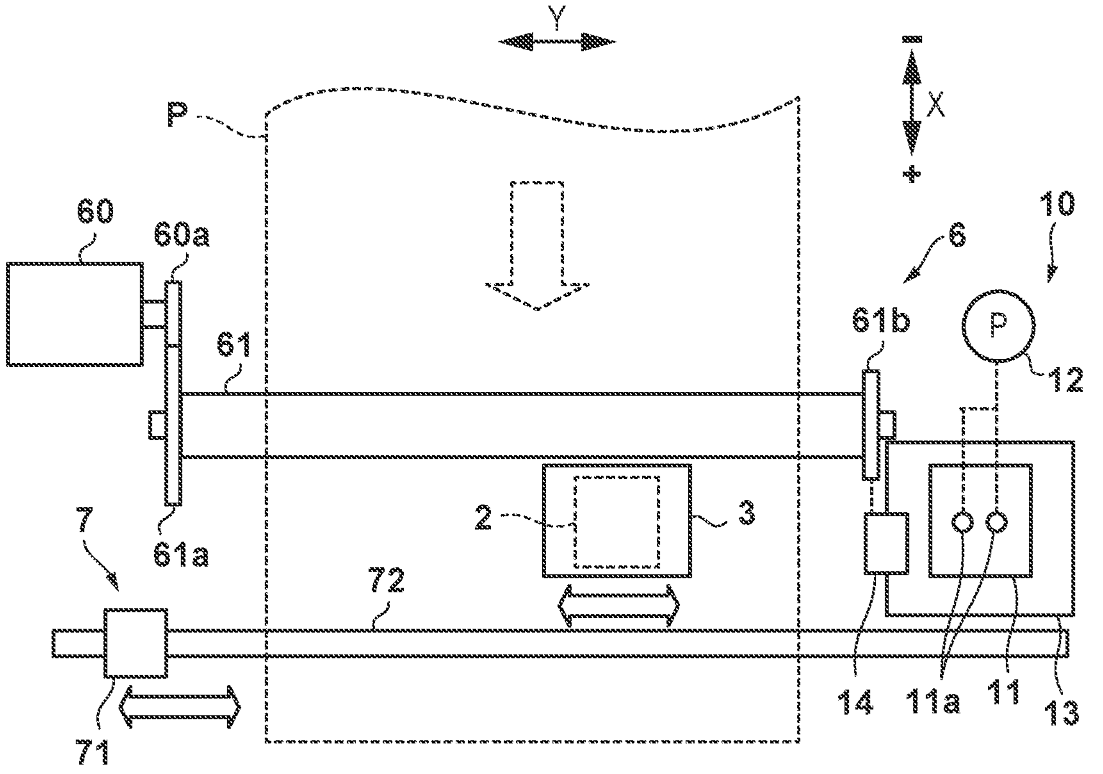

FIGS. 1A and 1B are schematic views of a printing apparatus 1 according to an embodiment of the present invention. In FIGS. 1A and 1B, an arrow X indicates the front-and-rear direction (depth direction) of the printing apparatus 1, +X means the front side, and −X means the rear side. An arrow Y indicates the left-and-right direction (widthwise direction) of the printing apparatus 1, which is orthogonal to the X direction. An arrow Z indicates the up-and-down direction. FIG. 1A schematically shows the internal structure of the printing apparatus 1 viewed from a side, and FIG. 1B shows the internal structure when a part of the printing apparatus 1 is viewed in a planar view. In this embodiment, a case where the present invention is applied to a serial type inkjet printing apparatus will be described. However, the present invention can also be applied to a printing apparatus of another type, and the printing apparatus may be a copying machine or a multi function peripheral.

Note that "print" includes not only formation of significant information such as a character or graphic pattern but also formation of an image, design, or pattern on print media in a broader sense regardless of whether the information is significant or insignificant or has become obvious to allow human visual perception. Also, "print media" may be paper, fabrics, plastic films, and the like.

The printing apparatus 1 uses a roll sheet P as a print medium. The roll sheet P is formed by winding one sheet into a roll around a tubular core. However, a cut sheet may be used as the print medium. Also, a user may be allowed to select the roll sheet or the cut sheet as the print medium.

The printing apparatus 1 includes a printhead 2 that discharges ink to the roll sheet P to form an image on the roll sheet P. The printhead 2 is supported by a carriage 3. Ink is supplied as a liquid from an ink tank (not shown) to the printhead 2. The ink tank may be integrated with or separated from the printhead 2. If separated, the ink tank may be mounted on the carriage 3, or may be arranged in a place different from the carriage 3.

The carriage 3 is reciprocally moved by a moving mechanism 4 in a direction (in this embodiment, the Y direction) crossing the conveyance direction (in this embodiment, the X direction) of the roll sheet P. The moving mechanism 4 is a mechanism using a CR motor (carriage motor) 40 as a driving source, and is, for example, a belt transmission mechanism. The belt transmission mechanism includes a pair of pulleys apart in the Y direction, and an endless belt wound around the pair of pulleys, and the carriage 3 is fixed to the endless belt. The endless belt is caused to travel by the CR motor 40 rotating the pulleys, and the carriage 3 is thus moved. The moving mechanism 4 may include a guide shaft that guides the movement of the carriage 3 in the Y direction. The guide shaft extends in the Y direction and engages with the carriage 3 such that the carriage 3 can freely slide.

As mechanisms for conveying the roll sheet P, the printing apparatus 1 includes a feeding unit 5 and a conveyance unit 6, which are arranged from the upstream side in the conveyance direction of the roll sheet P. The feeding unit 5 includes a support portion 51 that rotatably supports the roll sheet P. The roll sheet P is supported in such a posture that its widthwise direction (the axial direction of the roll) is set in the Y direction. The support portion 51 is rotated by the driving force of a feeding motor 50, and rotates the feeding motor 50. Depending on the rotation direction of the feeding motor 50, a feeding operation of feeding the roll sheet P to the conveyance unit 6 on the downstream side and a take-up operation in the reverse direction can be performed.

The conveyance unit 6 conveys, to the printhead 2, the roll sheet P conveyed by the feeding unit 5. In this embodiment, the conveyance unit 6 is formed by a conveyance roller. More specifically, the conveyance unit 6 includes a driving roller 61, and a driven roller 62 (pinch roller) pressed against the driving roller 61 by a spring (not shown). The driving roller 61 is rotated by the driving force of a conveyance motor 60. When the conveyance motor 60 rotates forward, the roll sheet P is sandwiched in the nip portion between the driving roller 61 and the driven roller 62, and the roll sheet P is conveyed in the +X direction to the printhead 2. In the take-up operation of the roll sheet P, the conveyance unit 6 can convey the roll sheet P to the upstream side (return the roll sheet P to the side of the feeding unit 5) along with the reverse rotation of the conveyance motor 60.

As described above, the printing apparatus 1 according to this embodiment is a serial type printing apparatus in which the printhead 2 is mounted on the carriage 3. A conveyance operation (intermittent conveyance operation) of conveying the roll sheet P by a predetermined amount by the conveyance unit 6 and a print scanning operation of discharging ink from the printhead 2 while moving the carriage 3 during conveyance stop are repeated, thereby performing a printing operation for the roll sheet P. An image (ink image) is formed on the roll sheet P by the printing operation. The roll sheet P is partially discharged from a discharge port 1*a* to the outside of the apparatus by the conveyance.

A cutting unit 7 is provided on the downstream side of the printhead 2. The cutting unit 7 cuts the printed roll sheet P. The cutting unit 7 includes, for example, a cutter 71 that is moved by the driving force of a cutter motor 70. The cutter 71 is guided by a guide 72 and moved in the direction (in this embodiment, the Y direction) crossing the conveyance direction of the roll sheet P. The cutter 71 stands by outside the conveyance path of the roll sheet P, and is moved to cross the conveyance path at the time of cutting to cut the roll sheet P. The cut roll sheet P is wholly discharged through the discharge port 1*a*.

The printing apparatus 1 includes an input/output unit 8 that outputs information to the user and accepts an instruction input of the user. The input/output unit 8 is, for example, a touch panel or a combination of hard keys and a display device. In this embodiment, the input/output unit 8 is a touch panel. The input/output unit 8 may include a device that outputs sound to the user. A human detection sensor 9 is a motion sensor that detects whether a person (user) exists on the periphery of the printing apparatus 1, and is, for example, an infrared sensor.

Figure 2A:
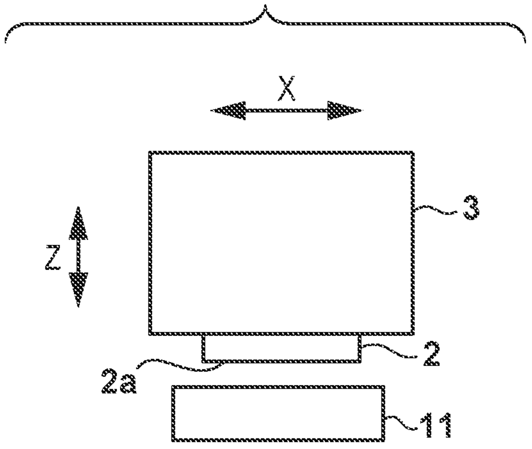
FIGS. 2A and 2B is an explanatory views of a non-capped state and a capped state.
Figure 2B:
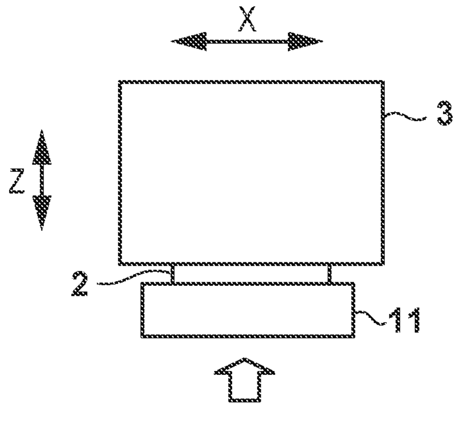

A maintenance unit 10 is provided at one end portion of the moving range of the carriage 3 in the Y direction. The maintenance unit 10 maintains/recovers the liquid discharge performance of the printhead 2 when the carriage 3 is located at a predetermined stop position (home position). The maintenance unit 10 includes a cap member 11. The cap member 11 covers the liquid discharge port (ink discharge port) of the printhead 2, thereby suppressing drying of the liquid discharge port. An operation mechanism 13 is a mechanism that switches the cap member 11 between a capped state and a non-capped state. FIG. 2A shows the non-capped state, and FIG. 2B shows the capped state.

In the non-capped state shown in FIG. 2A, the cap member 11 is apart from a liquid discharge port surface 2*a* of the printhead 2. The liquid discharge port surface 2*a* is the bottom surface of the printhead 2, and a plurality of liquid discharge ports are formed. In the capped state shown in FIG. 2B, the cap member 11 is attached to the lower portion of the printhead 2 to cover the liquid discharge port surface 2*a* (that is, the liquid discharge ports). In the capped state, drying of the liquid discharge ports is suppressed.

In the non-capped state, the liquid discharge performance of the printhead 2 can be maintained by discharging ink from the printhead 2 to the cap member 11 (so-called preliminary discharge). As shown in FIG. 1B, suction ports 11*a* communicating with a pump 12 are provided in the inner surface of the cap member 11. The ink preliminarily discharged to the cap member 11 is discharged from the suction ports 11*a* by driving the pump 12 in the non-capped state (so-called idle suction).

In this embodiment, the operation mechanism 13 lifts/lowers the cap member 11 between the capped state and the non-capped state. The driving source of the operation mechanism 13 is the conveyance motor 60 of the conveyance unit 6, that is, the driving source is shared with the conveyance unit 6. The driving force of the conveyance motor 60 is transmitted to the shaft of the driving roller 61 via gears 60*a* and 61*a* and further transmitted to the operation mechanism 13 via a gear 61*b* and an interrupting mechanism 14.

FIGS. 3A to 3D are explanatory views of the operation of a cam plate 110 provided in the operation mechanism 13. The operation mechanism 13 is a translation cam mechanism. The interrupting mechanism 14 includes gears 141 and 142 arranged on the same axis. Engaging portions 143 are formed on the opposing side surfaces of the gears 141 and 142. The gear 142 is provided to be displaceable in the axial direction, and the driving force of the conveyance motor 60 is input.

Figure 3A:
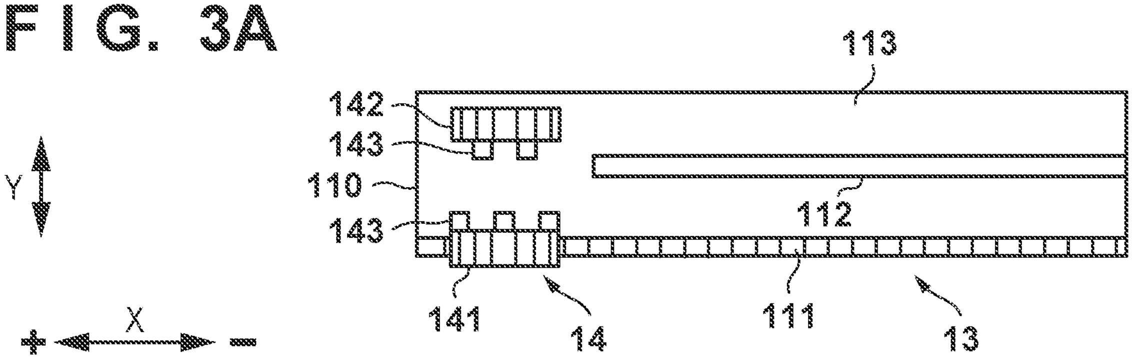
FIGS. 3A to 3D are explanatory views of the operation of a maintenance mechanism.
Figure 3B:
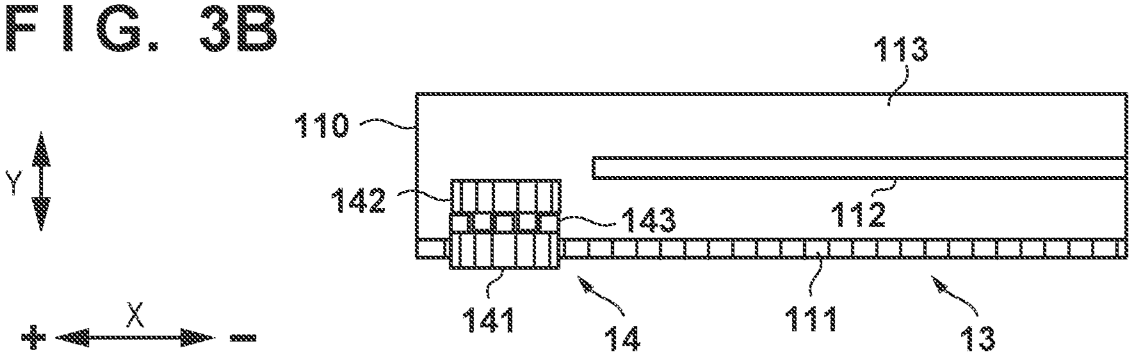
Figure 3C:
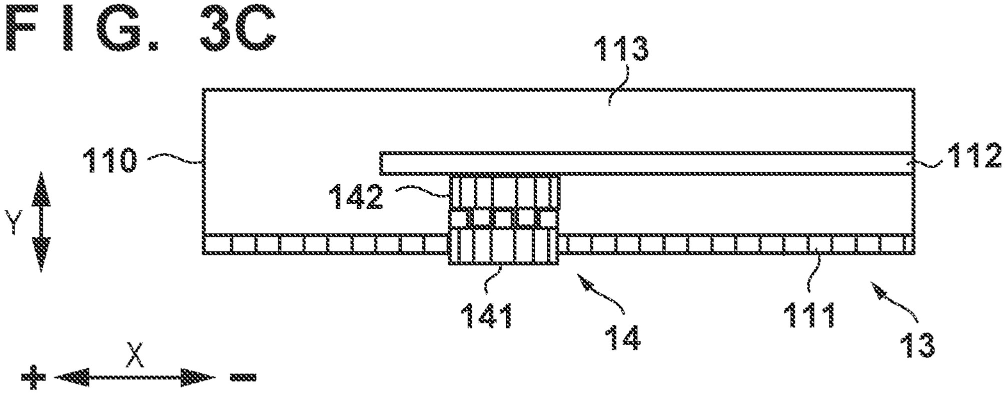
Figure 3D:
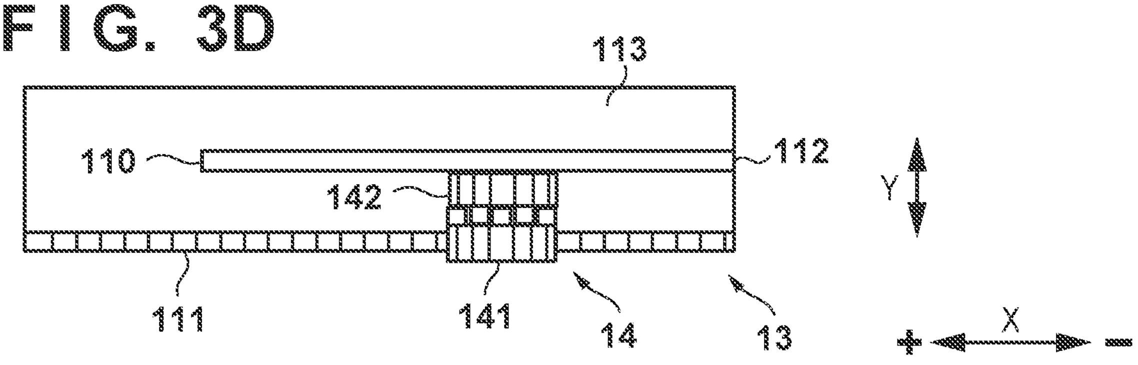

As shown in FIG. 3A, in a state in which the gears 141 and 142 are apart, and the engaging portions 143 do not engage, the driving force of the conveyance motor 60 is not transmitted to the gear 141. Hence, the operation mechanism 13 does not operate. Even if the user draws the roll sheet P during power interruption, and the driving roller 61 of the conveyance unit 6 rotates, the driving force of the driving roller 61 is not transmitted to the operation mechanism 13 in the state shown in FIG. 3A. Hence, the operation mechanism 13 does not operate accidentally. On the other hand, as shown in FIGS. 3B to 3D, in a state in which the gears 141 and 142 are close, and the engaging portions 143 engage, the driving force of the conveyance motor 60 is transmitted to the gear 141. Hence, the gear 141 rotates.

A plurality of stop positions are set on the moving path of the carriage 3. The interrupting mechanism 14 includes a lever member (not shown) that is pressed by the carriage 3 when the carriage 3 moves to a specific stop position (called a gear moving position), and can bring the gear 142 close to the gear 141 using the rotation of the lever member. That is, using the movement of the carriage 3, the gears 141 and 142 can be switched to a driving transmission state in which the engaging portions 143 engage.

On the cam plate 110, a rack 111 meshed with the gear 141 is extended in the X direction. By the rotation of the gear 141, the cam plate 110 moves in the X direction. On the cam plate 110, a guide wall 112 is extended in parallel to the rack 111. The guide wall 112 maintains the driving transmission state between the gear 141 and the gear 142. More specifically, as shown in FIG. 3B, the carriage 3 moves to the gear moving position, thereby setting the gears 141 and 142 in the driving transmission state in which the engaging portions 143 engage. After that, when the cam plate 110 is moved in the +X direction by driving the conveyance motor 60, the gear 142 is sandwiched between the gear 141 and the guide wall 112. Since the driving transmission state is maintained during the movement of the cam plate 110, the carriage 3 can move from the gear moving position.

The cam plate 110 includes a cam face 113 with an undulated structure in the Z direction. When the cam plate 110 moves in the X direction, the cap member 11 is lifted/lowered via a cam follower (not shown). For example, when the cam plate 110 is located at the positions shown in FIGS. 3A to 3C, the cap member 11 is in the non-capped state and can perform preliminary discharge. At the position in FIG. 3C, idle suction is possible. When the cam plate 110 is located at the position shown in FIG. 3D, the cap member 11 is lifted and set in the capped state.

In this embodiment, the operation mechanism 13 is a translation cam mechanism. However, the present invention is not limited to this, and various mechanisms can be employed. Also, although the conveyance motor 60 is shared as the driving source for moving the cam plate 110, a unique driving source for operating the operation mechanism 13 may be provided.

<Control Unit>

Figure 4:
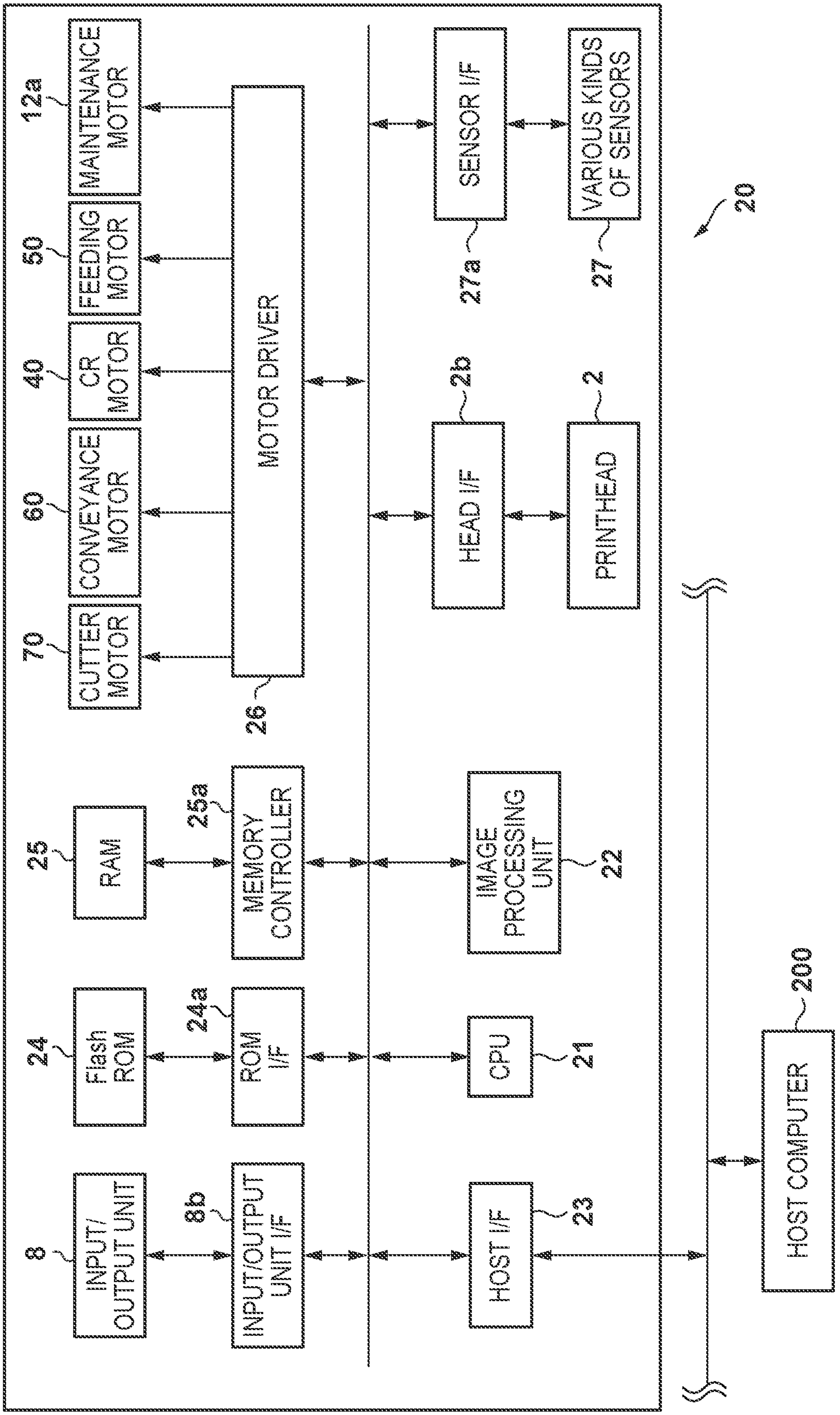
FIG. 4 is a block diagram of a control unit.

FIG. 4 is a block diagram of a control unit 20 of the printing apparatus 1. The control unit 20 includes a host I/F (interface) 23 and can communicate with a host computer 200 via a wired or wireless network. The host computer 200 is, for example, an external apparatus serving as print data supply source, and the printer driver for the printing apparatus 1 is installed in the host computer 200. The host I/F 23 receives print data from the host computer 200 by, for example, stream communication. The received print data can be stored in a RAM 25 via a memory controller 25*a*. The supply source of print data to the printing apparatus 1 may be an image reading apparatus, a digital camera, a smartphone, or the like.

The control unit 20 is an electric circuit including the following components connected via a system bus. A CPU 21 is a processor (microcomputer) and is the central processing unit of the control unit 20. The CPU 21 executes programs stored in a Flash ROM 24 and controls the overall operation of the printing apparatus 1. The control unit 20 includes a plurality of storage devices. The Flash ROM 24 is connected to the system bus via a ROM I/F 24*a*, and stores programs to be executed by the CPU 21 and data necessary for various kinds of control. The RAM 25 is connected to the system bus via the memory controller 25*a* and used as the work area of the CPU 21 or a temporary storage area for various kinds of data. Various kinds of data can include setting data associated with printing. The number and types of storage devices can appropriately be selected.

The image processing unit 22 performs various kinds of image processing. For example, the image processing unit 22 performs processing of rasterizing (converting) print data (for example, data expressed by a page description language) into image data (bitmap image data). The image processing unit 22 also converts the color space (for example, YCbCr) of image data included in input print data into a standard RGB color space (for example, sRGB). In addition, the image processing unit 22 performs various kinds of image processing such as syntax analysis, resolution conversion, image analysis, and image correction for image data, as needed. Image data obtained by image processing is stored in the RAM 25.

The printhead 2 is connected to the system bus via a head I/F 2*b*. A maintenance motor 12*a* configured to drive the pump 12, the CR motor 40, the feeding motor 50, the conveyance motor 60, and the cutter motor 70 are individually driven by a motor driver 26. Various kinds of sensors 27 are connected to the system bus via a sensor I/F 27*a*, and the CPU 21 can acquire the detection results of the various kinds of sensors 27. The human detection sensor 9 is included in the various kinds of sensors 27. In addition to the human detection sensor 9, the various kinds of sensors 27 include a detection sensor for the conveyance position of the roll sheet P, a detection sensor for the position of the carriage 3, and the like. The input/output unit 8 is connected to the system bus via an input/output unit I/F 8*b*. In this embodiment, the input/output unit 8 is fixed to the printing apparatus 1. However, the present invention is not limited to this, and the input/output unit 8 may be, for example, a terminal capable of communicating with the control unit 20 via a network, and a plurality of terminals may be provided. Also, the host computer 200 can be used as the input/output unit 8.

<Example of Processing>

Figure 5:
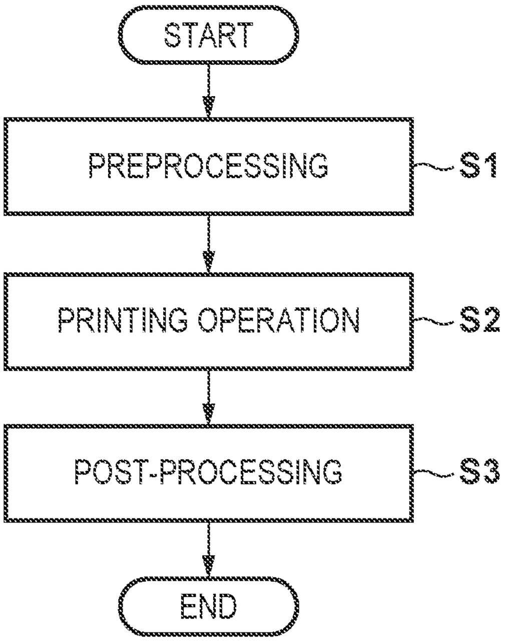
FIG. 5 is a flowchart showing an example of processing executed by the control unit.

An example of processing executed by the CPU 21 of the control unit 20 will be described. FIG. 5 is a flowchart showing an example print control. When a print job is received from the host computer 200, processing shown in FIG. 5 is executed. The print job includes print data and setting data.

In step S1, preprocessing is executed. Preprocessing is processing associated with preparation of a printing operation. For example, the roll sheet P is conveyed up to an image formation start position. In addition, when the cap member 11 is in the capped state, it is switched to the non-capped state. In step S2, a printing operation is performed. In the printing operation, as described above, the intermittent conveyance operation of the roll sheet P by the conveyance unit 6 and print scanning by the printhead 2 during conveyance stop are repeated, and an image is formed on the roll sheet P. In step S3, post-processing is executed. In post-processing, processing associated with cut of the roll sheet Pis mainly performed.

<Post-Processing>

In this embodiment, concerning cutting of the roll sheet P, the user can select one of two types of cutting settings. The two types of cutting settings will be referred to as an automatic cutting mode and a cutting instruction mode. In the automatic cutting mode, after the printing operation (step S2), the roll sheet P is automatically cut by the cutting unit 7. On the other hand, in the cutting instruction mode, the cutting unit 7 is operated based on a cutting instruction of the user, thereby cutting the roll sheet P.

In the cutting instruction mode, the user can cut the roll sheet P at the timing desired by himself/herself. This can obtain the following advantages for the user. For example, before the roll sheet P falls from the discharge port 1*a* onto the floor, the user can hold it by a hand to prevent an image from becoming dirty. When cutting is performed after confirming that an image has dried, it is possible to prevent the quality from lowering due to touch on the image.

Selection of the automatic cutting mode or the cutting instruction mode may be set by the user on the host computer 200, and information representing the selection result may be included in the print job. The selection may be accepted by the input/output unit 8. The selection result can be stored in, for example, the RAM 25 and read out and referred to as needed. Selection of the automatic cutting mode or the cutting instruction mode may automatically be set in accordance with the type of the print medium or print data (an ink discharge amount or the like).

On the other hand, in the cutting instruction mode, since the roll sheet P is cut after waiting for the cutting instruction of the user, the wait time may be long. When the printing operation (step S2) is ended, the cap member 11 is in the non-capped state. Hence, when the wait time is long, drying of the liquid discharge port of the printhead 2 may progress. In this embodiment, when the wait time reaches a predetermined time (defined as time T), the cap member 11 is set in the capped state. This suppresses drying of the liquid discharge port. The time T is, for example, about 5 min.

Figure 6:
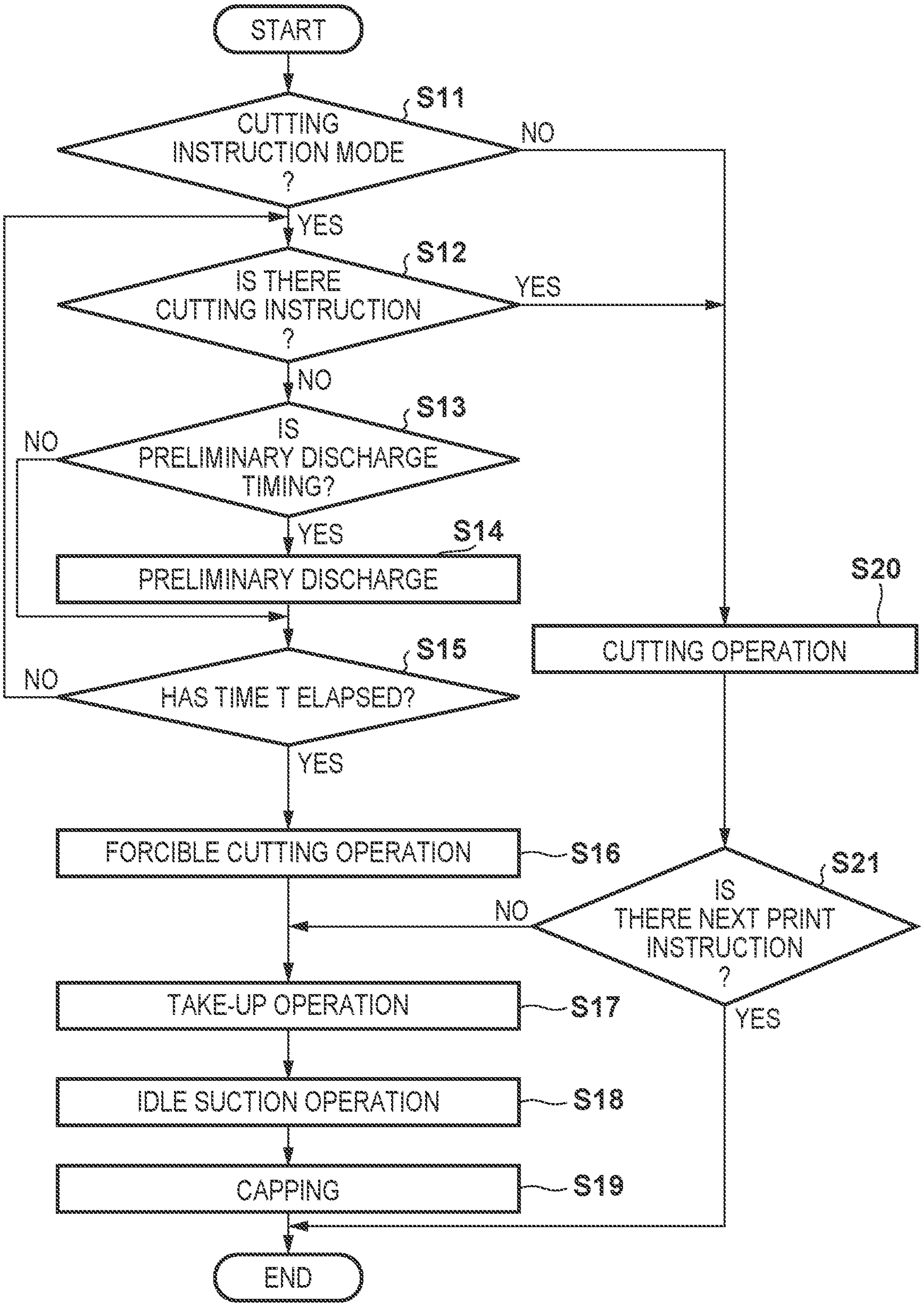
FIG. 6 is a flowchart showing an example of processing executed by the control unit.

FIG. 6 is a flowchart showing an example of post-processing in step S3. In step S11, information stored in the RAM 25 is referred to, and it is determined whether the cutting instruction mode is set. When the cutting instruction mode is set, acceptance of the cutting instruction is started, and the process advances to step S12. With the start of the acceptance of the cutting instruction, count of the wait time is also started. The acceptance of the cutting instruction is performed by the input/output unit 8. Display control and the like of the input/output unit 8 will be described later with reference to FIGS. 7A and 7B. When the cutting instruction mode is not set (in the case of the automatic cutting mode), the process advances to step S20.

In step S12, it is determined whether the cutting instruction from the user exists. When the cutting instruction exists, the process advances to step S20. When the cutting instruction does not exist, the process advances to step S13. In step S20, the cutting unit 7 is driven to cut the roll sheet P. In step S21, it is determined whether the next print instruction exists (whether the next print job is received). When the next print instruction exists, the post-processing is ended. After that, preprocessing (step S1) is started. When the next print instruction does not exist, the process advances to step S17.

In step S13, it is determined whether it is the preliminary discharge timing. When it is the preliminary discharge timing, the process advances to step S14 to drive the printhead 2 and perform preliminary discharge. In this embodiment, by the processes of steps S13 and S14, preliminary discharge is performed at a predetermined interval (for example, 2 sec) during the wait for the cutting instruction. This can suppress drying of the liquid discharge port even if the cap member 11 is in the non-capped state. The interval to perform preliminary discharge is set from the viewpoint of drying suppression.

In step S15, it is determined whether the wait time reaches the time T. When the wait time reaches the time T, the process advances to step S16. When the wait time does not reach the time T, the process returns to step S12 to continuously wait for the cutting instruction.

When the wait time reaches the time T, the cap member 11 is switched from the non-capped state to the capped state, as described above. To operate the operation mechanism 13, the conveyance motor 60 needs to be driven. During the wait, the roll sheet P with the image formed thereon is sandwiched between the driving roller 61 and the driven roller. When the conveyance motor 60 is driven, the roll sheet P moves. Hence, first, although the cutting instruction of the user does not exist, in step S16, the cutting unit 7 is driven to cut the roll sheet P with the image formed thereon. This processing can be called a forcible cutting operation because the roll sheet P is cut without a user instruction.

In step S17, to make the roll sheet P retreat from the conveyance unit 6, the feeding unit 5 is driven to take up the roll sheet P. At this time, the conveyance unit 6 may also be driven to convey the roll sheet P in the −X direction. The length to take up is at least the distance length from the conveyance unit 6 to the cutting unit 7. By the take-up operation in step S17, the roll sheet P does not exist in the conveyance unit 6 anymore, and the operation mechanism 13 can be operated by driving the conveyance motor 60.

In step S18, the cam plate 110 is moved to the position in FIG. 3C, and the pump 12 (maintenance motor 12*a*) is driven to perform idle suction of the cap member 11. Ink accumulated in the cap member 11 can be discharged by the preliminary discharge. In step S19, the cam plate 110 is moved to the position in FIG. 3D to switch the cap member 11 to the capped state. This can suppress drying of the liquid discharge port of the printhead 2. Post-processing is thus ended.

Figure 7A:
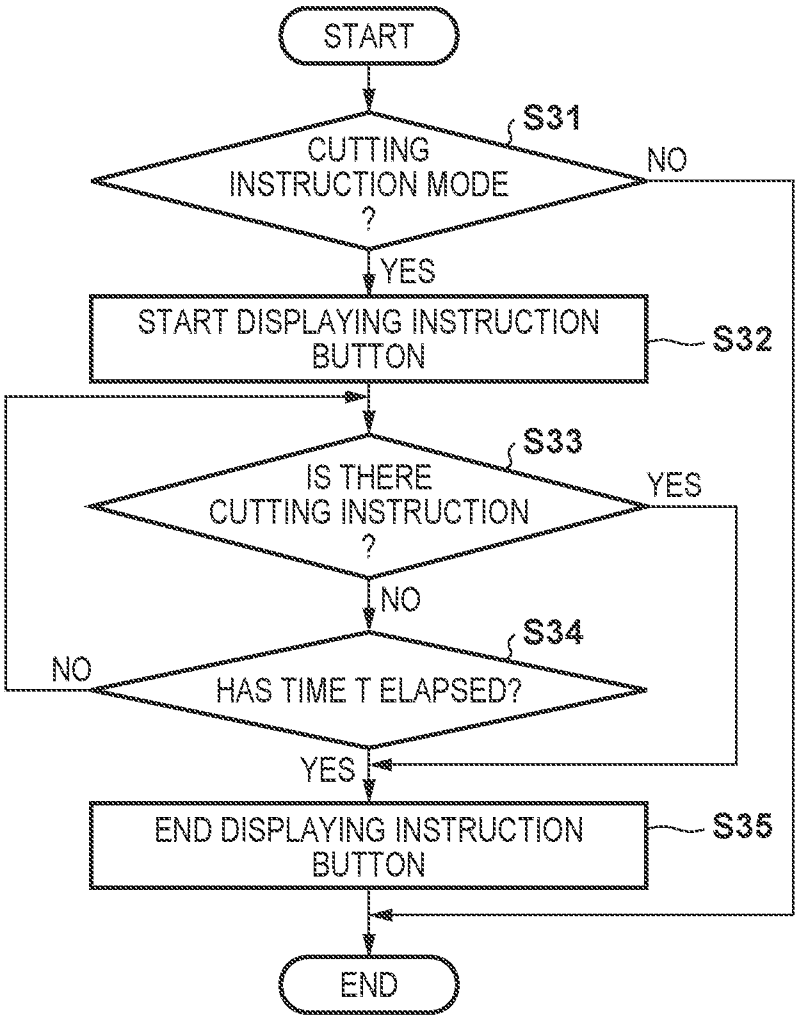
FIG. 7A is a flowchart showing an example of processing executed by the control unit.
Figure 7B:
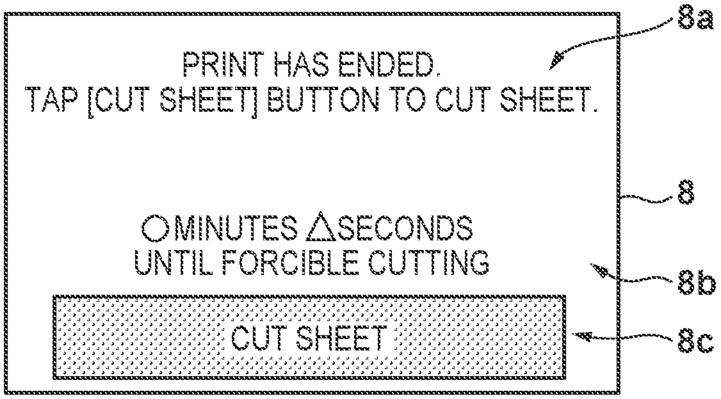
FIG. 7B is a view showing a display example of an input/output unit.

Display control of the input/output unit 8 in the post-processing will be described with reference to FIG. 7A. In step S31, information stored in the RAM 25 is referred to, and it is determined whether the cutting instruction mode is set. When the cutting instruction mode is set, the process advances to step S32 to start displaying an instruction button for accepting the cutting instruction of the user, and acceptance of the cutting instruction is started. FIG. 7B shows a display example of the input/output unit 8.

The display example includes messages 8*a* and 8*b* and an instruction button 8*c*, and a notification to the user is performed. The message 8*a* describes that when the user taps the instruction button 8*c*, the roll sheet P is cut, and notifies the user that the apparatus is waiting for the cutting instruction. The message 8*b* notifies the time left until reaching the time T, and particularly indicates the time left until the forcible cutting operation in step S16 is executed. This notification can urge the user to input the cutting instruction, and can notify the user of the timing of executing the forcible cutting operation.

Referring back to FIG. 7A, in step S33, it is determined whether the cutting instruction exists (whether the instruction button 8*c* is tapped). When the cutting instruction exists, the process advances to step S35. When the cutting instruction does not exist, the process advances to step S34. In step S34, it is determined whether the time T has elapsed. When the time T has elapsed, the process advances to step S35. When the time T has not elapsed, the process returns to step S33. In step S35, display of the instruction button is ended. Here, in addition to the instruction button 8*c* shown in FIG. 7B, display of the messages 8*a* and 8*b* is also ended.

Second Embodiment

Figure 8A:
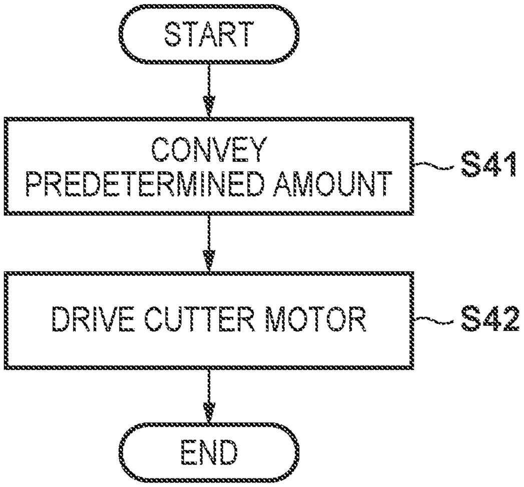
FIGS. 8A to 8C are flowcharts showing an example of processing executed by a control unit.

As a case where a forcible cutting operation (step S16) is executed, a case where the user is away from a printing apparatus 1 can be considered, and a cut sheet after cutting falls from a discharge port 1*a*. Due to the impact of falling, the cut sheet may be folded or damaged, resulting in lower quality. To prevent this, a roll sheet P may be conveyed by a predetermined amount in the +X direction and stopped before cutting, and the roll sheet P may be cut after that. The leading edge of the roll sheet P comes close to the landing point, and the impact in falling can be reduced. FIG. 8A is a flowchart showing an example of processing of the forcible cutting operation (step S16) according to this embodiment.

In step S41, a conveyance unit 6 is driven to convey the roll sheet P by a predetermined amount in the +X direction. A feeding unit 5 is also driven as needed to assist conveyance of the roll sheet P. The conveyance amount is, for example, 10 cm to several tens of cm. In step S42, a cutter motor 70 is driven to cut the roll sheet P. The cut sheet after cutting is discharged from the discharge port 1*a*. At this time, when the leading edge of the cut sheet already reaches or is close to the landing point, the impact of falling can be reduced.

As another measure for reducing the impact of falling of the cut sheet after cutting, the cutting speed may be changed between the forcible cutting operation (step S16) and the normal cutting operation (step S20). In the forcible cutting operation (step S16), the cutting speed is reduced as compared to the normal cutting operation. Since the cut sheet after cutting slowly falls from the discharge port 1*a*, the impact of falling can be reduced. On the other hand, in the normal cutting operation, the cutting speed is made relatively high, thereby improving throughput. In this embodiment, the cutting speed is the moving speed of a cutter 71.

Figure 8B:
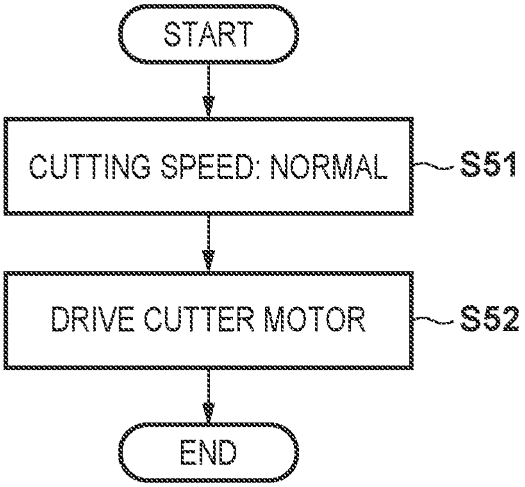

FIG. 8B is a flowchart showing an example of processing of the normal cutting operation (step S20). In step S51, the cutting speed is set to the normal speed. In step S52, the cutter 71 is moved at the cutting speed set in step S51 to cut the roll sheet P.

Figure 8C:
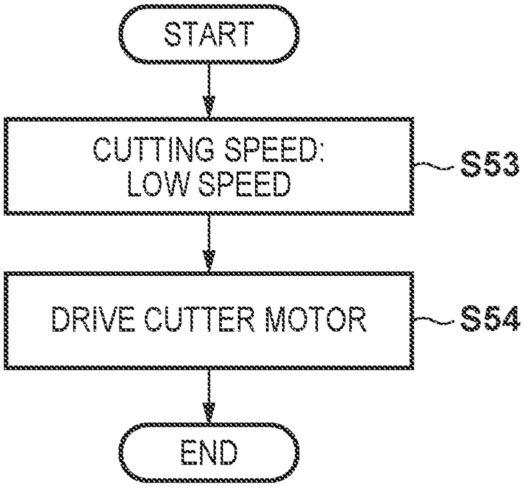

FIG. 8C is a flowchart showing an example of processing of the forcible cutting operation (step S16). In step S53, the cutting speed is set to a low speed. The low speed is, for example, a half of the normal speed. In step S54, the cutter 71 is moved at the cutting speed set in step S53 to cut the roll sheet P.

Third Embodiment

Figure 9A:
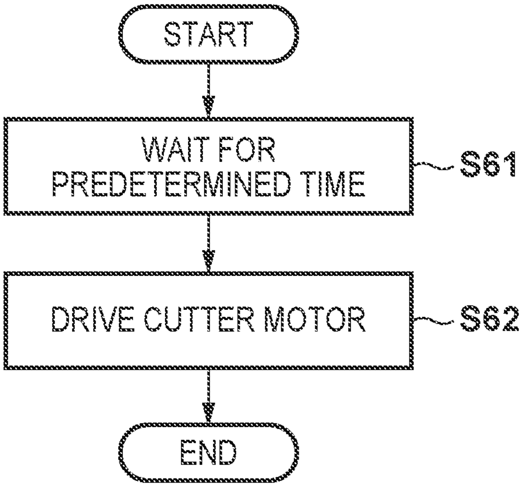
FIG. 9A is a flowchart showing an example of processing executed by a control unit.
Figure 9B:
FIG. 9B is a view showing a display example of an input/output unit.

When executing the forcible cutting operation (step S16), cutting may be performed after the user is notified that a roll sheet P is to be cut. This can urge the user to do preparation such that the user can be aware of execution of the forcible cutting operation and support, by a hand, the roll sheet P discharged from a discharge port 1*a*. FIG. 9A is a flowchart showing an example of processing of a forcible cutting operation (step S16). In step S61, the processing waits to cut for a predetermined time. The predetermined time is, for example, several tens of sec. During this time, a warning indicating that the roll sheet P is to be cut is displayed on an input/output unit 8, as shown in FIG. 9B, thereby making a notification. In step S62, a cutter motor 70 is driven to cut the roll sheet P. The user who is aware of the notification can take an appropriate action.

Fourth Embodiment

Figure 10:
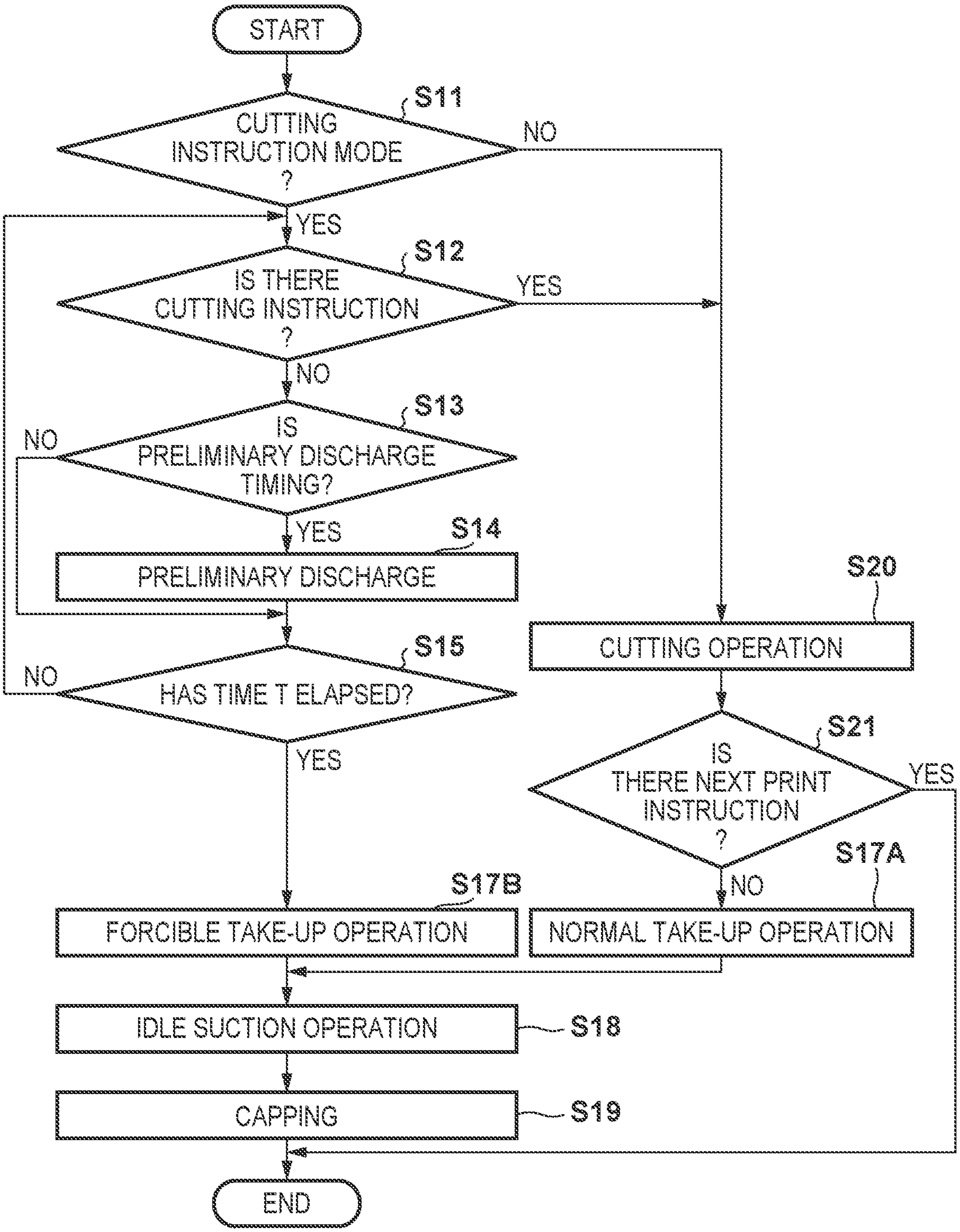
FIG. 10 is a flowchart showing an example of processing executed by a control unit.

When the cutting instruction wait time reaches a time T, a roll sheet P may be taken up by a feeding unit 5 without performing a forcible cutting operation (step S16). FIG. 10 is a flowchart of post-processing (step S3) according to this embodiment. Processes different from the example in FIG. 6 will be described.

If it is determined in step S21 that the next print instruction does not exist, the process advances to step S17A. Also, when the wait time reaches the time T in step S15, the process advances to step S17B. The operations of steps S17A and S17B are the same in terms of taking up the roll sheet P by driving the feeding unit 5 to make the roll sheet P retreat from a conveyance unit 6, as in step S17 of FIG. 6.

However, at the stage of step S17A, since the operation is executed after the roll sheet P is cut, the image printed portion exists on the cut sheet after cutting but not on the roll sheet P. The length to take up is at least the distance length from the conveyance unit 6 to a cutting unit 7. On the other hand, at the stage of step S17B, the roll sheet P is not cut yet, and the image printed portion exists on the roll sheet P. The length to take up is at least the length from the conveyance unit 6 to the leading edge of the roll sheet P. Depending on the length of the printed portion in the X direction, at least a part of the image printed portion is taken up by the cylindrical portion of the roll sheet P. The take-up operation in step S17B can also be called a forcible take-up operation because it is performed without a user instruction.

After that, an idle suction operation in step S18 and capping in step S19 are performed, and post-processing is ended. In this embodiment, since the forcible cutting operation (step S16) of the roll sheet P is not performed, quality never lowers due to falling of the cut sheet.

Figure 11A:
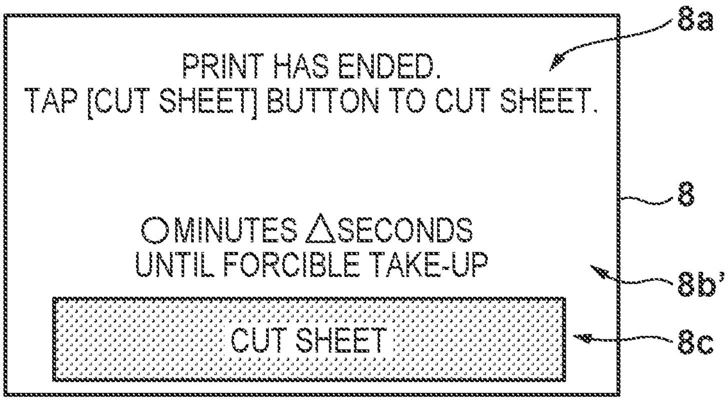
FIG. 11A is a view showing a display example of an input/output unit.

FIG. 11A shows a display example of the input/output unit 8 according to this embodiment, and particularly shows a display example during the wait for the cutting instruction. The basic configuration of the display example shown in FIG. 11A is the same as that of the display example shown in FIG. 7B. The display example includes messages 8*a* and 8*b*' and an instruction button 8*c*, and a notification to the user is performed. The message 8*b*' notifies the time left until reaching the time T, and particularly indicates the time left until the take-up operation in step S17B is executed. This notification can urge the user to input the cutting instruction, and can notify the user of the timing of executing the forcible take-up operation.

Fifth Embodiment

The take-up speed of a roll sheet P in a forcible take-up operation (step S17B) may be lower than the take-up speed of the roll sheet P in the normal take-up operation (step S17A) according to the fourth embodiment. In the normal take-up operation (step S17A), the roll sheet P is taken up at a higher speed, thereby improving throughput. In the forcible take-up operation (step S17B), the roll sheet P is taken up at a lower speed. When taking up an image printed portion by the cylindrical portion of the roll sheet P, this can suppress lowering of quality caused by rubbing of the image with another portion of the roll sheet P. The take-up speed can be controlled by the rotation speed of a feeding motor 50. In the forcible take-up operation (step S17B), the feeding motor 50 is rotated at a speed, for example, a half of the speed in the normal take-up operation (step S17A). The switching setting of the rotation speed is set at the start of each take-up operation (step S17A or S17B).

Sixth Embodiment

In the first embodiment, when performing a forcible cutting operation (step S16), when an image on a roll sheet P is not sufficiently dried, the image printed portion may contact an object around when the cut sheet falls after cutting, resulting in lower quality. Also, in the fourth embodiment, when performing a forcible take-up operation (step S17B), when an image on the roll sheet Pis not sufficiently dried, set-off or lowering of image quality may occur when the image printed portion is taken up by the cylindrical portion of the roll sheet P.

When the time T is made long, drying of the image is promoted, but drying of the liquid discharge port simultaneously progresses. To prevent this, ink is wastefully consumed by preliminary discharge.

On the other hand, the drying time of the image changes depending on a print condition such as a print medium type or an ink discharge amount. For example, the drying time is shorter in plain paper than in glossy paper. The drying time is shorter in a character image that needs a small ink discharge amount than in a photo image that needs a large ink discharge amount.

Figure 11B:
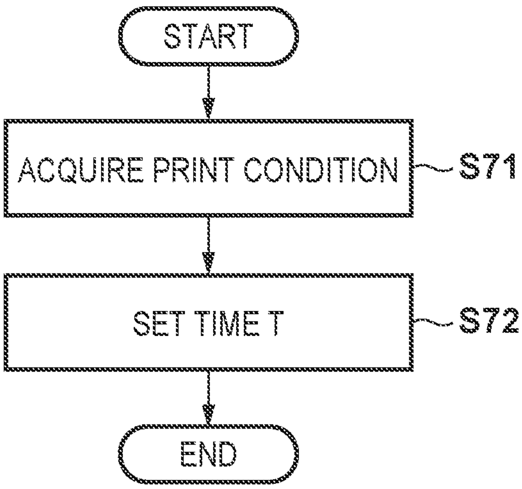
FIG. 11B is a flowchart showing an example of processing executed by a control unit.

Hence, the time T may be set in accordance with the print condition in each printing. FIG. 11B is a flowchart showing an example of setting processing, and this is executed before the start of post-processing. In step S71, a print condition is acquired. Print conditions are, for example, various kinds of settings included in a print job, and include a print medium type and print data. An evaluation value concerning the ink discharge amount can be obtained from the print data. The evaluation value is, for example, an average ink discharge count per scanning. In step S72, the time T is set based on the print condition acquired in step S71. The relationship between the time T and the print condition can be stored as a table in the Flash ROM 24 in advance, and in the setting of step S72, the time T may be set by referring to the stored table.

Seventh Embodiment

Figure 12:
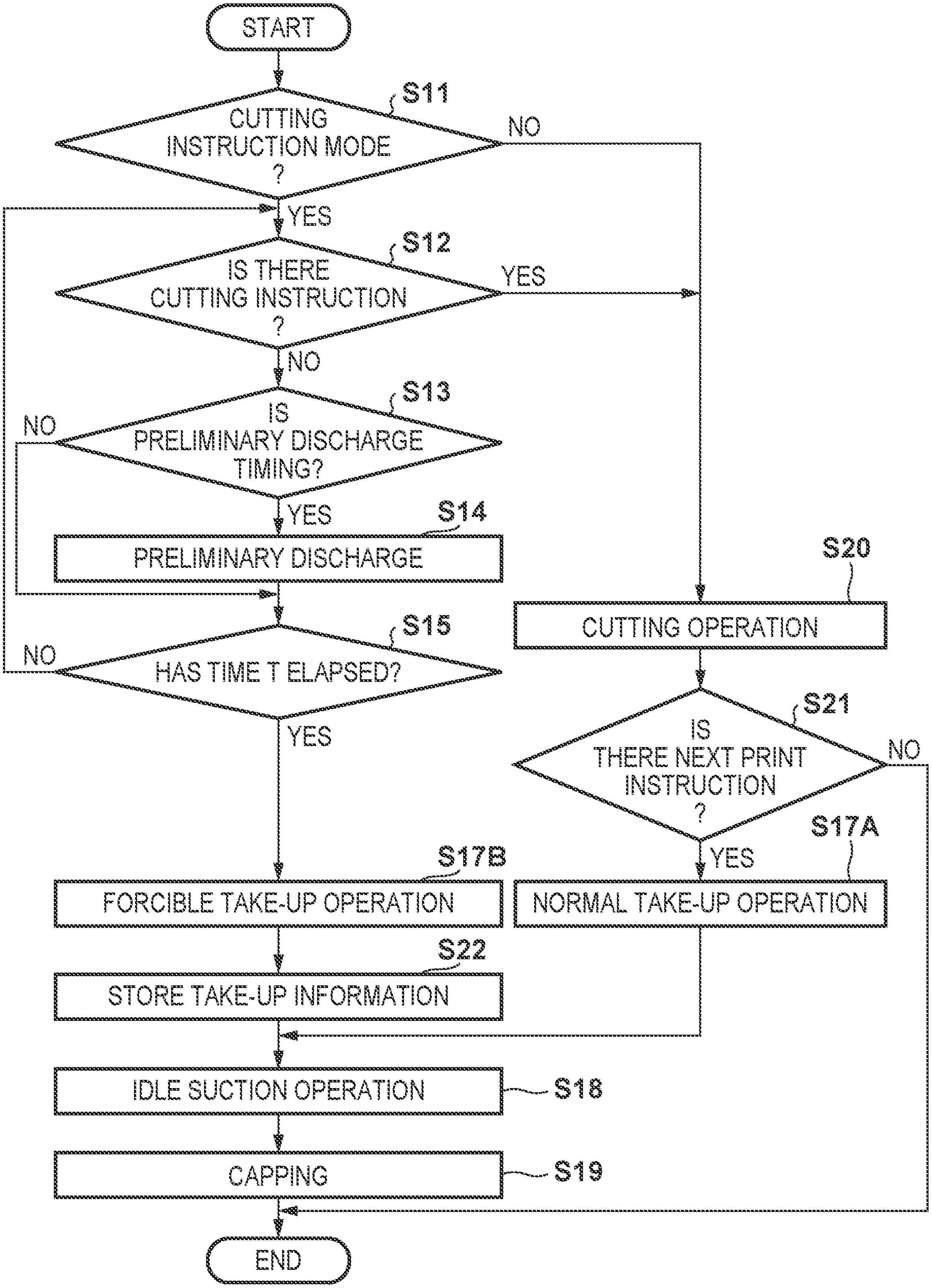
FIG. 12 is a flowchart showing an example of processing executed by a control unit.

In the fourth embodiment, when the forcible take-up operation (step S17B) is performed, an image printed portion exists on a roll sheet P. This needs to be discharged until next printing. As an assumption, in this embodiment, information (called take-up information) representing that the forcible take-up operation is performed is stored. The storage destination is, for example, a Flash ROM 24 or a RAM 25. FIG. 12 is a flowchart of post-processing (step S3) according to this embodiment. Processes different from the example shown in FIG. 10 will be described.

After the forcible take-up operation is executed in step S17B, take-up information is stored in step S22. In this embodiment, the take-up information includes not only the information representing that the forcible take-up operation is executed but also information representing the length of the roll sheet P that has been taken up.

Figure 13A:
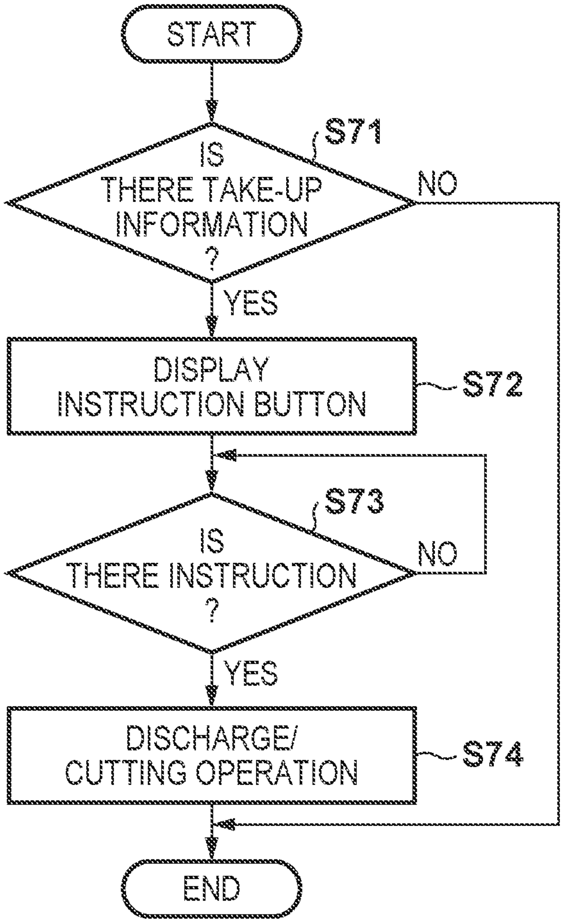
FIG. 13A is a flowchart showing an example of processing executed by the control unit.

The discharge operation and the cutting operation of the roll sheet P using the take-up information will be described. The discharge/cutting operation is executed when a predetermined condition is satisfied. For example, when the user instructs, or at the time of next printing, the operation can automatically be executed. FIG. 13A is a flowchart showing an example of processing of the discharge/cutting operation based on a user instruction, and this is periodically repetitively executed.

Figure 13B:
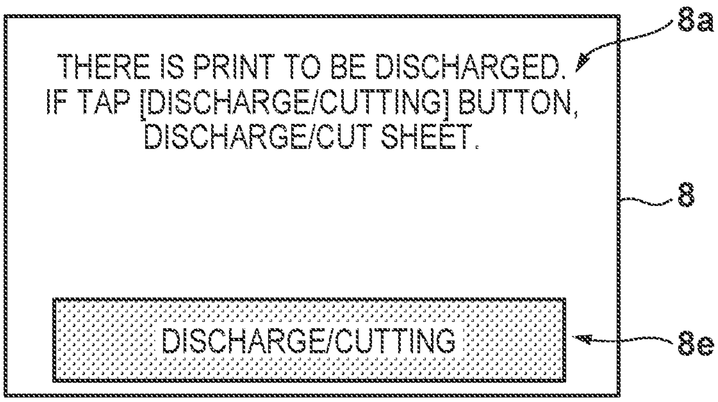
FIG. 13B is a view showing a display example of an input/output unit.

In step S71, it is determined whether the take-up information is stored. When the take-up information is stored, the process advances to step S72. If the take-up information is not stored, the processing is ended. In step S72, an instruction button is displayed on an input/output unit 8. FIG. 13B is a view showing a display example of the input/output unit 8. In the example shown in FIG. 13B, an instruction button 8*e* for instructing discharge/cutting is displayed together with a message 8*d* that notifies that a printed portion to be discharged exists on the roll sheet P due to the forcible take-up operation (step S17B). The user taps the instruction button 8*e*, thereby instructing execution of the discharge/cutting operation.

Referring back to FIG. 13A, in step S73, it is determined whether an instruction is input from the user (whether the instruction button 8*e* is tapped). If an instruction is input, the process advances to step S74. In step S74, the discharge/cutting operation is performed. Here, a feeding unit 5 and a conveyance unit 6 are driven to feed the roll sheet P by the length of the roll sheet P taken up, which is included in the take-up information. After that, a cutting unit 7 is driven to cut the roll sheet P. Thus, a cut sheet including the printed portion taken up is discharged.

Note that in the example shown in FIG. 13A, the discharge/cutting operation is executed based on condition that a user instruction is input. However, the discharge/cutting operation may be executed on condition that a human detection sensor 9 detects the existence of a user around a printing apparatus 1.

Figure 13C:
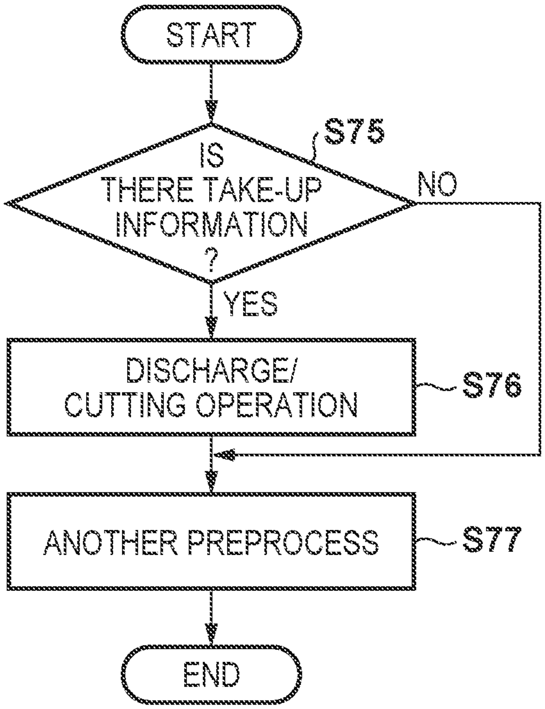
FIG. 13C is a flowchart showing an example of processing executed by the control unit.

Next, FIG. 13C shows an example of processing executed at the time of next printing. The example shown in FIG. 13C is an example in which the processing is executed in preprocessing (step S1). In step S75, it is determined whether take-up information is stored. If take-up information is stored, the process advances to step S76. If take-up information is not stored, in step S77, another process of preprocessing is executed. In step S76, the discharge/cutting operation is performed. Here, the feeding unit 5 and the conveyance unit 6 are driven to feed the roll sheet P by the length of the roll sheet P taken up, which is included in the take-up information. After that, the cutting unit 7 is driven to cut the roll sheet P. Thus, a cut sheet including the printed portion taken up is discharged.

Eighth Embodiment

Figure 14:
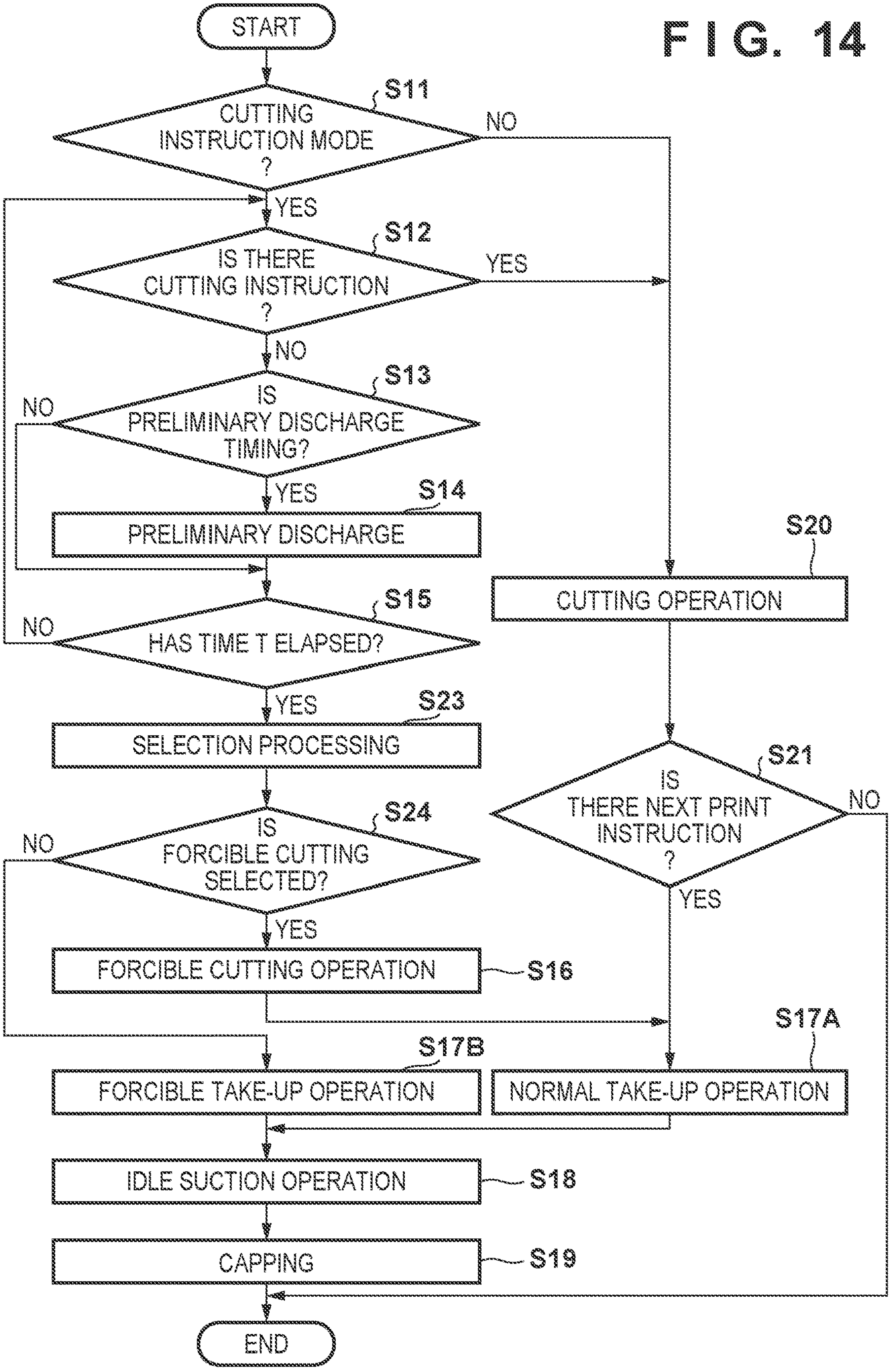
FIG. 14 is a flowchart showing an example of processing executed by a control unit.

When the wait time of the cutting instruction of the user reaches a time T, a forcible cutting operation (step S16) may be performed, and a forcible take-up operation (step S17A) may then be performed. Alternatively, the forcible take-up operation (step S17B) may be performed without performing the forcible cutting operation. FIG. 14 is a flowchart of post-processing (step S3) according to this embodiment. Processes different from the example in FIG. 6 will be described.

If it is determined in step S21 that the next print instruction exists, the process advances to step S17A to perform a normal take-up operation. The contents of the normal take-up operation in step S17A are the same as the normal take-up operation according to the fourth embodiment.

When the wait time reaches the time T in step S15, the process advances to selection processing in step S23. In the selection processing, whether to perform the forcible cutting operation (step S16) and then perform the normal take-up operation (step S17A) or perform the forcible take-up operation (step S17B) without performing the forcible cutting operation is selected.

As the selection method, for example, a method of selecting an operation selected by the user in advance or a method of selecting based on a print condition can be used. In the former case, the user may select an operation on a print job basis or may select an operation uniformly independently of a print job. In the latter case, an operation can be selected in accordance with the drying state of an image on a roll sheet P. The drying time of the image changes depending on a print condition such as a print medium type or an ink discharge amount. For example, the drying time is shorter in plain paper than in glossy paper. The drying time is shorter in a character image that needs a small ink discharge amount than in a photo image that needs a large ink discharge amount. In a case where drying of the image is insufficient, when the forcible take-up operation is performed, set-off or lowering of image quality may occur. Hence, discharging the printed portion by performing the forcible cutting operation is advantageous. When drying of the image progresses to some extent, the possibility that the above-described problem occurs is low even if the forcible take-up operation is performed. Since the printed portion may be damaged due to falling of the cut sheet in the forcible cutting operation, selecting the forcible take-up operation is advantageous.

Print conditions are, for example, various kinds of settings included in a print job, and include a print medium type and print data. An evaluation value concerning the ink discharge amount can be obtained from the print data. The evaluation value is, for example, an average ink discharge count per scanning. The print conditions also include, for example, an image type. These include colors, for example, monochrome, several specific colors such as two colors, and full color, and contents to be printed, for example, a line art, an image (a photo or the like), and a mixture of these. There are also image settings, for example, a density, a resolution, and a roughness.

In step S24, it is determined, based on the selection result in step S23, whether the forcible cutting operation is selected. When the forcible cutting operation is selected, the process advances to step S16. When the forcible cutting operation is not selected (when the forcible take-up operation is selected), the process advances to step S17B.

In step S16, the forcible cutting operation is performed. The contents are the same as the forcible cutting operation described in the first embodiment. After that, the process advances to step S17A to perform the normal take-up operation. The contents of the normal take-up operation in step S17A are the same as the normal take-up operation according to the fourth embodiment. After that, the process advances to step S16.

In step S17B, the forcible take-up operation is performed. The contents are the same as the forcible take-up operation according to the fourth embodiment. After that, the process advances to step S16.

As described above, in this embodiment, when the wait time of the cutting instruction of the user reaches the time T, the forcible cutting operation or the forcible take-up operation is selectively performed. It is therefore possible to perform an operation according to the desire of the user or the print condition.

Ninth Embodiment

When the cutting instruction mode is set, a notification for urging the user to input a cutting instruction may be done even at a timing other than post-processing. This can urge the user to input the cutting instruction. The notification may be performed always or periodically during preprocessing (step S1) and the printing operation (step S2), or may be performed always or periodically during the printing operation (step S2).

Figure 15A:
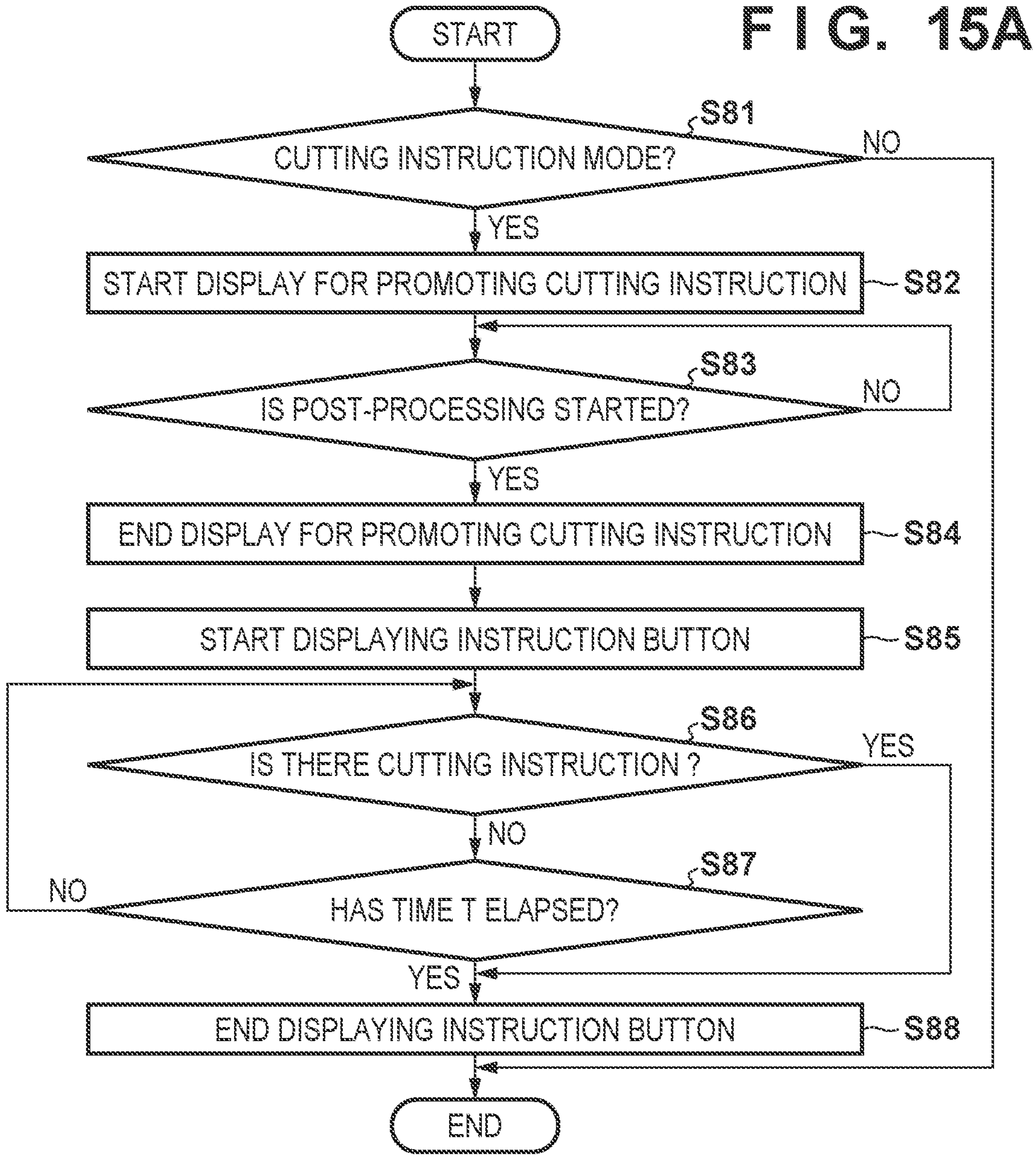
FIG. 15A is a flowchart showing an example of processing executed by a control unit.
Figure 15B:
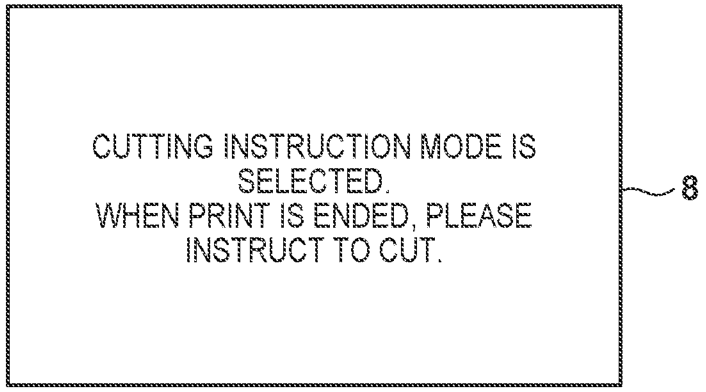
FIG. 15B is a view showing a display example of an input/output unit.

FIG. 15A shows an example in which a notification is made by display on an input/output unit 8, and shows an example of display control of the input/output unit 8. In step S81, information stored in a RAM 25 is referred to, and it is determined whether the cutting instruction mode is set. When the cutting instruction mode is set, the process advances to step S82 to start display for promoting a cutting instruction. FIG. 15B shows a display example. In the example shown in FIG. 15B, a message for urging the user to instruct cutting after the end of the printing operation is displayed. When such a notification is made before post-processing (step S3), the user can be urged to input the cutting instruction.

Referring back to FIG. 15A, in step S83, it is determined whether post-processing (step S3) is started. If it is determined that post-processing is started, the process advances to step S84. In step S84, display for promoting the cutting instruction, which is started in step S82, is ended. In step S85, display of an instruction button for accepting the cutting instruction of the user is started, and acceptance of the cutting instruction is started. The display example is the same as described with reference to FIG. 7B. In step S86, it is determined whether the cutting instruction exists (in the example shown in FIG. 7B, whether an instruction button 8*c* is tapped). When the cutting instruction exists, the process advances to step S88. When the cutting instruction does not exist, the process advances to step S87. In step S87, it is determined whether a time T has elapsed. When the time T has elapsed, the process advances to step S88. When the time T has not elapsed, the process returns to step S86. In step S88, display of the instruction button is ended.

Figure 16:
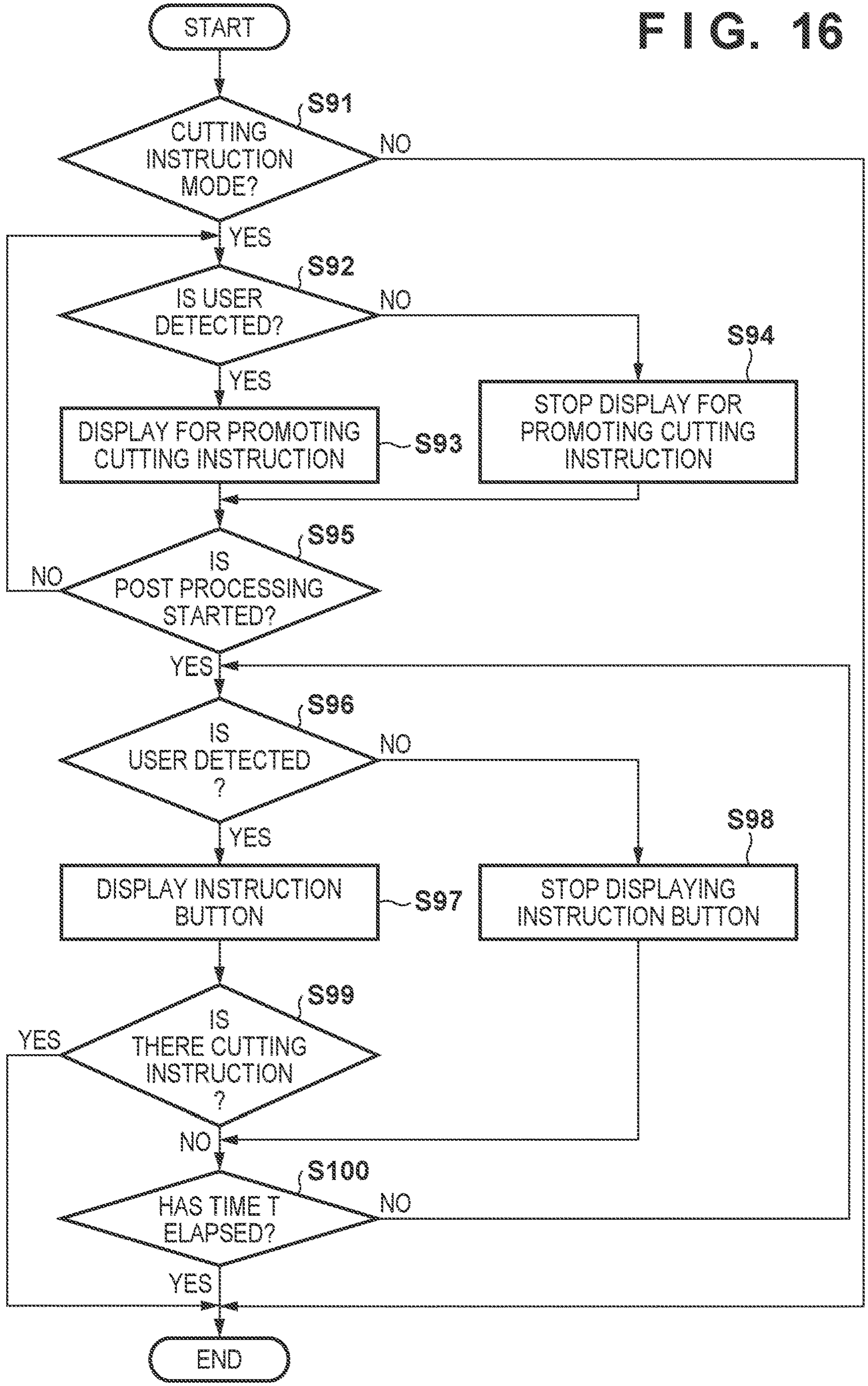
FIG. 16 is a flowchart showing an example of processing executed by the control unit.

When the notification shown in FIG. 7B or 15B cannot catch the attention of the user, power is wastefully consumed. Hence, the notification may be made only when the existence of the user around a printing apparatus 1 is detected. FIG. 16 is a flowchart showing a processing example replacing the processing example shown in FIG. 15A.

In step S91, information stored in the RAM 25 is referred to, and it is determined whether the cutting instruction mode is set. When the cutting instruction mode is set, the process advances to step S92 to acquire the detection result of a human detection sensor 9 and determine whether the user is detected around the printing apparatus 1. When the user is detected, the process advances to step S93. When the user is not detected, the process advances to step S94. In step S93, display for promoting the cutting instruction shown in FIG. 15B is performed. In step S94, display for promoting the cutting instruction is not performed.

In step S95, it is determined whether post-processing (step S3) is started. If it is determined that post-processing is started, the process advances to step S96. The detection result of the human detection sensor 9 is acquired, and it is determined whether the user is detected around the printing apparatus 1. When the user is detected, the process advances to step S97. When the user is not detected, the process advances to step S98. In step S97, display of the instruction button for accepting the cutting instruction of the user is started, and acceptance of the cutting instruction is started. The display example is the same as described with reference to FIG. 7B. Note that if display for promoting the cutting instruction is being performed, this is ended. In step S98, the instruction button is not displayed.

In step S99, it is determined whether the cutting instruction exists (in the example shown in FIG. 7B, whether the instruction button 8*c* is tapped). When the cutting instruction exists, the processing is ended. Note that when the instruction button is being displayed, this is ended. When the cutting instruction does not exist, the process advances to step S100. In step S100, it is determined whether the time T has elapsed. When the time T has not elapsed, the process returns to step S96. When the time T has elapsed, the processing is ended. Note that when the instruction button is being displayed, this is ended.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-186522, filed Nov. 16, 2021, which is hereby incorporated by reference herein in its entirety.

What is claimed is:

1. A printing apparatus comprising:
- a printhead including a discharge port configured to discharge ink;
- a cap member configured to be moved between a capped position at which the discharge port is covered by the cap member and a non-capped position away from the capped position;
- a conveyance unit configured to convey a print medium to the printhead;
- a cutting unit configured to cut the print medium on which an image is formed by the printhead; and
- a processor configured to control the cutting unit based on a cutting instruction of a user in a case in which a cutting setting is set,
- wherein in the case in which the cutting setting is set,
  - the cap member waits for the cutting instruction at the non-capped position,
  - preliminary discharge for discharging ink from the discharge port to the cap member is performed during a wait time for the cutting instruction, and
  - the cap member is moved to the capped position after the wait time for the cutting instruction reaches a predetermined time.

2. The apparatus according to claim 1, further comprising a suction unit configured to suck, from the cap member, the ink discharged to the cap member,
- wherein in the case in which the cutting setting is set, after the wait time reaches the predetermined time, the suction unit sucks the ink from the cap member and the cap member is then moved to the capped position.

3. The apparatus according to claim 1, further comprising a notification unit configured to make a notification for urging the user to perform the cutting instruction in the case in which the cutting setting is set.

4. The apparatus according to claim 3, further comprising a detection unit configured to detect whether the user exists around the printing apparatus,
- wherein the notification unit makes the notification on condition that the user is detected by the detection unit.

5. The apparatus according to claim 1, further comprising a feeding unit configured to feed a roll sheet as the print medium to the conveyance unit, wherein the cap member is moved to the capped position by a driving force of a driving source of the conveyance unit.

6. The apparatus according to claim 5, wherein in the case in which the cutting setting is set, after the wait time reaches the predetermined time, the cap member is moved to the capped position after a first operation or a second operation, the first operation is an operation of cutting the roll sheet by operating the cutting unit and making the roll sheet retreat from the conveyance unit by taking up the roll sheet by the feeding unit, and the second operation is an operation of making the roll sheet retreat from the conveyance unit by taking up the roll sheet by the feeding unit without cutting the roll sheet.

7. The apparatus according to claim 6, wherein one of the first operation and the second operation is selected based on a print condition.

8. A printing apparatus comprising:

a printhead including a discharge port configured to discharge ink;

a cap member configured to be moved between a capped position at which the discharge port is covered by the cap member and a non-capped position away from the capped position;

a conveyance unit configured to convey a print medium to the printhead;

a cutting unit configured to cut the print medium on which an image is formed by the printhead;

a processor configured to control the cutting unit based on a cutting instruction of a user in a case in which a cutting setting is set; and a notification unit configured to, during a wait time for the cutting instruction, notify the user that the cutting instruction is waited for, wherein in the case in which the cutting setting is set, the cap member waits for the cutting instruction at the non-capped position, and the cap member is moved to the capped position after the wait time for the cutting instruction reaches a predetermined time.

9. The apparatus according to claim 8, wherein the notification by the notification unit includes at least a notification of a time left until the wait time reaches the predetermined time.

10. A printing apparatus comprising:

a printhead including a discharge port configured to discharge ink;

a cap member configured to be moved between a capped position at which the discharge port is covered by the cap member and a non-capped position away from the capped position;

a conveyance unit configured to convey a print medium to the printhead;

a cutting unit configured to cut the print medium on which an image is formed by the printhead;

a feeding unit configured to feed a roll sheet as the print medium to the conveyance unit; and a processor configured to control the cutting unit based on a cutting instruction of a user in a case in which a cutting setting is set, wherein in the case in which the cutting setting is set, the cap member waits for the cutting instruction at the non-capped position, and after a wait time for the cutting instruction reaches a predetermined time, the cutting unit is driven to cut the roll sheet, the roll sheet is taken up by the feeding unit to make the roll sheet retreat from the conveyance unit, and the cap member is moved to the capped position.

11. The apparatus according to claim 10, wherein in the case in which the cutting setting is set, after the wait time reaches the predetermined time, the conveyance unit conveys the print medium by a predetermined amount and then stops the conveyance before the cutting unit is operated to cut the roll sheet.

12. The apparatus according to claim 10, wherein in the case in which the cutting setting is set, the cutting unit is operated at a first cutting speed to cut the roll sheet based on the cutting instruction; and after the wait time reaches the predetermined time, the cutting unit is operated at a second cutting speed lower than the first cutting speed to cut the roll sheet.

13. The apparatus according to claim 10, further comprising a notification unit configured to, after the wait time reaches the predetermined time, notifies the user that the roll sheet is to be cut before the cutting unit cuts the roll sheet.

14. The apparatus according to claim 10, wherein the predetermined time is set based on a print condition.

15. A printing apparatus comprising:

a printhead including a discharge port configured to discharge ink;

a cap member configured to be moved between a capped position at which the discharge port is covered by the cap member and a non-capped position away from the capped position;

a conveyance unit configured to convey a print medium to the printhead;

a cutting unit configured to cut the print medium on which an image is formed by the printhead;

a feeding unit configured to feed a roll sheet as the print medium to the conveyance unit; and a processor configured to control the cutting unit based on a cutting instruction of a user in a case in which a cutting setting is set, wherein in the case in which the cutting setting is set, the cap member waits for the cutting instruction at the non-capped position, and after a wait time for the cutting instruction reaches a predetermined time, the roll sheet is taken up by the feeding unit to make the roll sheet retreat from the conveyance unit, and the cap member is moved to the capped position.

16. The apparatus according to claim 15, wherein in the case in which the cutting setting is set, after the roll sheet is cut based on the cutting instruction, the roll sheet is taken up by the feeding unit at a first take-up speed, and after the wait time reaches the predetermined time, the roll sheet is taken up by the feeding unit at a second take-up speed lower than the first take-up speed to make the print medium retreat from the conveyance unit, and the cap member is moved to the capped position.

17. The apparatus according to claim 15, wherein in the case in which the cutting setting is set, information representing that the roll sheet is taken up is stored in a storage unit after the wait time reaches the predetermined time so that the roll sheet is taken up by the feeding unit.

18. The apparatus according to claim 17, wherein the information includes information representing a length of the roll sheet taken up.

19. The apparatus according to claim 17, wherein when the information is stored in the storage unit, and a predetermined condition is satisfied, a discharge operation of the roll sheet taken up is executed.

20. The apparatus according to claim 19, wherein the predetermined condition is an instruction of the user.

21. The apparatus according to claim 15, wherein the predetermined time is set based on a print condition.

* * * * *